G. C. CAMPBELL.
STEERING GEAR FOR VEHICLES.
APPLICATION FILED OCT. 18, 1915.

1,223,766.

Patented Apr. 24, 1917.

INVENTOR.
George C. Campbell
BY Louis C. Vanderlip.
ATTORNEYS.

UNITED STATES PATENT OFFICE.

GEORGE C. CAMPBELL, OF ELKHART, INDIANA.

STEERING-GEAR FOR VEHICLES.

1,223,766.　　　　　Specification of Letters Patent.　　Patented Apr. 24, 1917.

Application filed October 18, 1915.   Serial No. 56,626.

*To all whom it may concern:*

Be it known that I, GEORGE C. CAMPBELL, a citizen of the United States, residing at Elkhart, county of Elkhart, and State of Indiana, have invented new and useful Improvements in Steering-Gears for Vehicles, of which the following is a specification.

My invention relates to steering gear for vehicles, and more especially to four wheeled hand pushed vehicles of the baby cab class, and the like. The object of my invention is the provision and application of mechanical means to the two front wheels of a hand pushed four wheel vehicle of the kind described whereby the vehicle may be guided to the right or left by lateral exertion on the vehicle handle or the rear end thereof, thereby dispensing with the necessity of lifting the entire front end of the vehicle and swinging the entire vehicle for guidance thereof, as is now generally practised.

Figure 1:
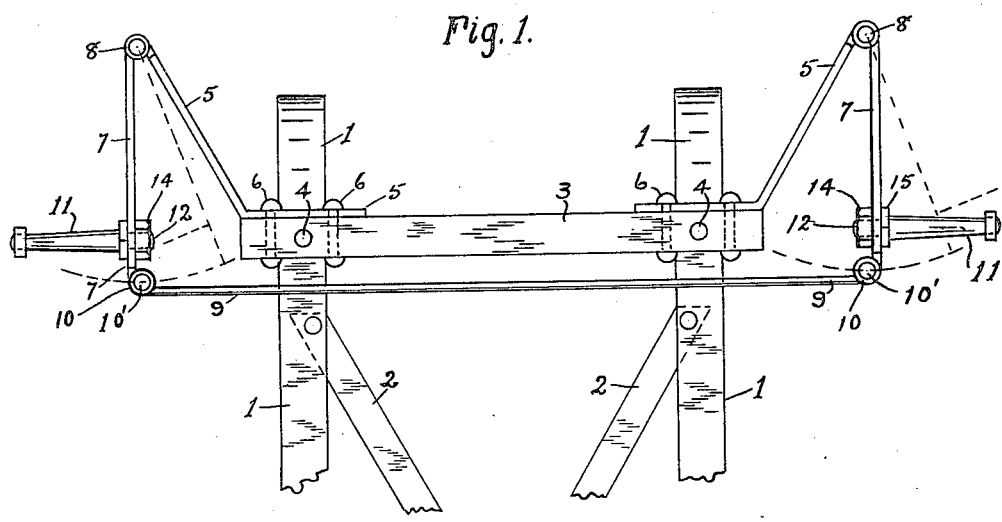
Figure 2:
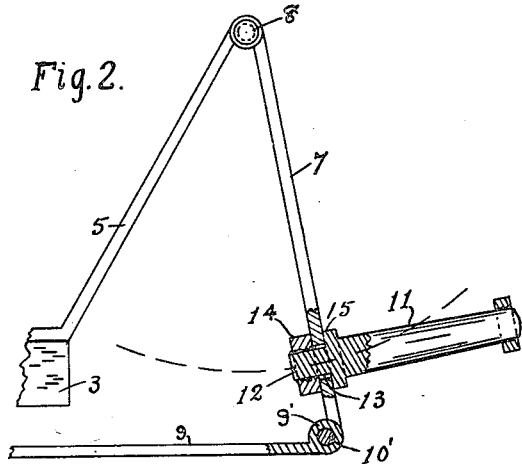

On the drawings, Figure 1 is a plan view of the front end of a vehicle frame embodying the invention; and Fig. 2 is a fragmentary view showing an enlargement of one of the axles and carriers, with portions thereof in section. Similar numerals refer to similar parts and members throughout the several views on the drawing.

Referring to the drawings in detail, the numerals 1, 1 designate parallel longitudinal frame members of a vehicle frame, adapted to be carried upon four wheels, joined together by the braces 2, 2 secured thereto in any suitable manner. The numeral 3 designates a transverse front end frame member of the vehicle which is rigidly secured to the frame members 1, 1 by the bolts 4, 4. The numerals 5, 5 designate carrier brackets rigidly secured to opposite ends of frame member 3 by the bolts 6, 6, and which extend angularly forward and outward therefrom. The numerals 7, 7 designate axle carriers pivotally mounted upon the brackets 5, 5 by hinges 8, 8 and adapted to swing in a horizontal plane thereon. Each carrier 7 is provided also with a hinge member 10 at the rear end thereof in which is detachably mounted a hinge pin 10'. The numeral 9 designates a link member provided with an eye 9' at each end thereof which is carried by the hinge pin 10', the link 9 extending transversely of the vehicle frame and connecting the ends of the carriers 7 for spacing the same and to create simultaneous and equal movement thereof. The numeral 11, 11 designate a pair of wheel axles each of which is provided with a short shaft 12 detachably mounted within the aperture 13 formed in the axle carrier 7 adjacent the rear end thereof and rigidly retained therein by the nut 14 screw threaded to the end of shaft 12. The axle 11 is provided also with a collar, or shoulder, 15 which is drawn tightly against the outer face of the carrier 7 by the actuation of the nut 14.

When the wheels of a vehicle equipped with my invention are pointed directly ahead the axles 11, 11 are in axial alinement with a transverse center line through the frame member 3. To steer a vehicle equipped with my invention lateral pressure is brought to bear on the rear, or handle, of the vehicle which pressure acts directly upon the carriers 7, 7 at the hinges 8, 8, thereby causing one carrier 7 to swing inward and the other outward, the former having its front, or hinged, end projected outward, and the latter drawn laterally, by the brackets 5, 5. Thus, lateral pressure exerted in the manner described toward the left guides, or turns, the moving vehicle toward the right hand of the operator. When no pressure is applied, or when the pressure is released, the carriers 7, 7 gradually but rapidly swing back to their normal position, in which the vehicle proceeds in a straight line forward.

Normally, the wheels of the vehicle will point and travel directly ahead when once allowed to assume that position, and the carriers 7, 7 will remain in a plane substantially parallel with the longitudinal center plane of the vehicle body.

I claim—

1. The combination with a vehicle frame provided with a pair of axle carrier brackets and an axle carrier pivotally mounted upon each of the latter and linked to each other adjacent the end opposite the pivotal mount thereof, each of said axle carriers being apertured substantially in a horizontal plane, of a wheel axle rigidly mounted within said axle carrier aperture and adapted to swing therewith.

2. The combination with a vehicle frame provided with a pair of axle carrier brackets and an axle carrier pivotally mounted upon each of the latter and linked to each other adjacent the end opposite the pivotal mount thereof, each of said axle carriers being apertured substantially in a horizontal plane intermediate its extremities, of a wheel axle having one end thereof arranged within said axle carrier aperture; and means for detachably fastening said axle within said aperture.

3. The combination with a vehicle frame provided with a pair of axle carrier brackets, each of said axle carrier brackets having an axle carrier pivotally mounted thereon, the latter being provided with a wheel axle, of a link pivotally connecting said axle carriers and adapted solely to space said carriers when lateral pressure is exerted upon the vehicle frame for vehicle steering purposes.

4. In a vehicle of the class described, the combination with the vehicle frame, of a pair of carrier brackets rigidly supported by said frame and extending forward and outward therefrom; a substantially straight axle carrier bar hinged to each of said brackets at the outer end of the latter and adapted to swing therefrom in a horizontal plane, said carrier bar extending rearwardly from its hinged mount and being provided with an aperture intermediate its extremities; a wheel axle rigidly mounted in said axle carrier aperture and projecting laterally therefrom; and a link pivotally connected with each of said carrier bars at a point rearwardly of said axle mount and adapted solely to space said carrier bars when lateral pressure is exerted upon the vehicle frame for vehicle steering purposes.

In testimony whereof I have hereunto affixed my signature this 15th day of October, 1915.

GEORGE C. CAMPBELL.

Copies of this patent may be obtained for five cents each, by addressing the "Commissioner of Patents, Washington, D. C."